Patented July 25, 1933

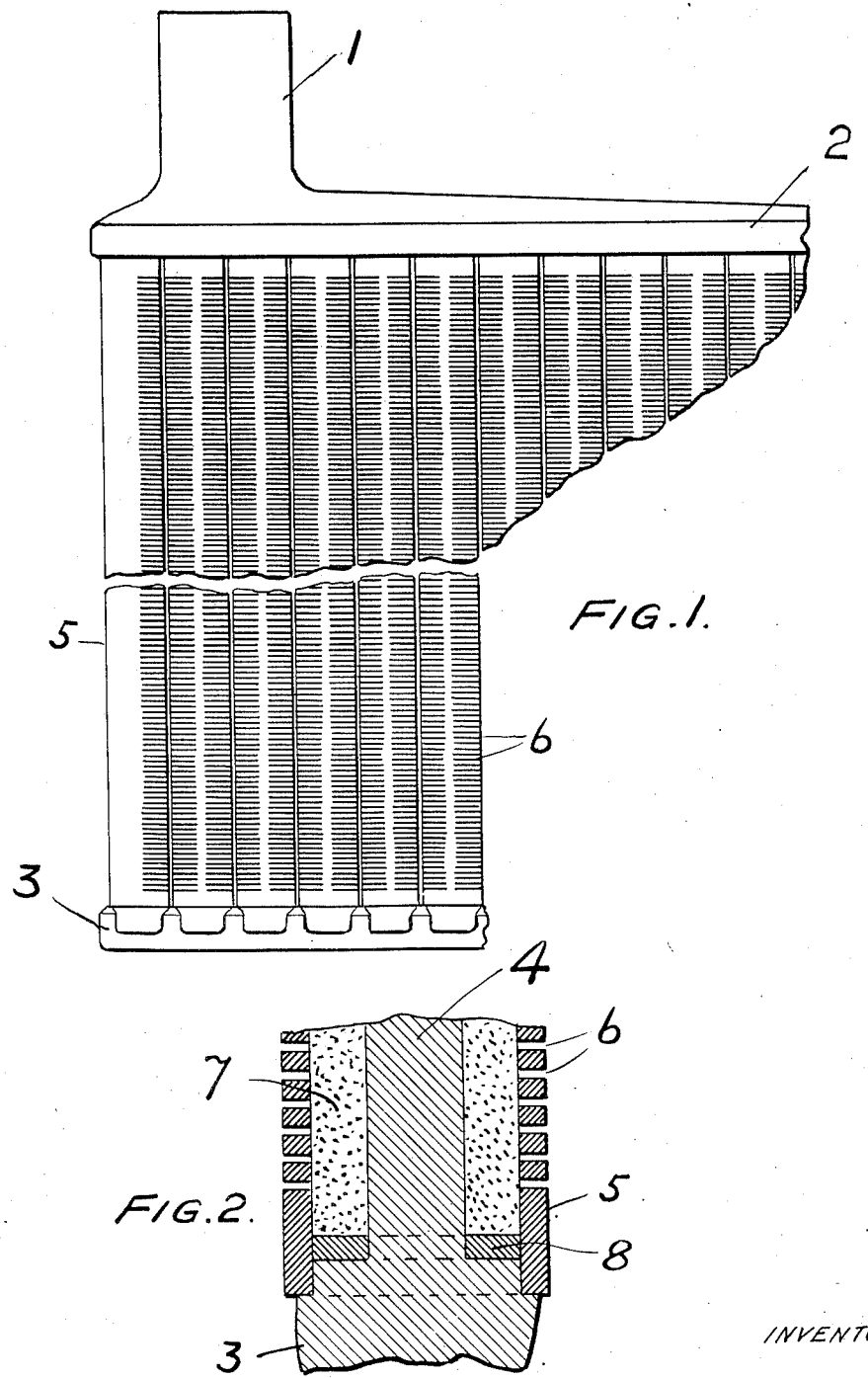

1,919,883

UNITED STATES PATENT OFFICE

CHARLES D. GALLOWAY, OF WYNDMOOR, PENNSYLVANIA

STOPPERED TUBULAR STORAGE BATTERY ELEMENT

Application filed May 2, 1930. Serial No. 449,129.

My invention relates to storage battery plates consisting of a series of vertical hard rubber tubes, slotted transversely and assembled on a grid consisting of a series of vertical conducting spines passing through the axes of the tubes and connected by metallic top and bottom bars, the tubes being filled with the active material of the positive plate, comprising powdered oxides of lead.

The bottom is usually formed after the tubes have been applied to the spines and the active material filled into the space between the spine and the tube in the form of powdered lead oxides with the plate inverted. The bottom bar is then formed by pouring molten metal into the lower ends of the tubes, thus completely sealing the ends of the tubes, the molten metal uniting with the spines to form a continuous structure.

More particularly, my improvement consists of a washer or plug, which may be of hard rubber or similar material resistant to the action of the electrolyte, threaded over the lower end of the conducting spine just inside the bottom of the hard rubber tube and forming a spacer or barrier between the active material and the bottom bar.

It is found in the operation of a plate of this type that the bottom bar in the course of time becomes corroded at the bottom of the hard rubber tube, and eventually openings are thus made through which the active material may sift out, thus reducing the capacity and ultimately shortening the life of the plate. The hard rubber washer or plug of this invention will prevent this loss of active material, even though the bottom bar may have become very considerably corroded.

While hard rubber is mentioned as a suitable material for these washers or plugs, other materials might be used and a barrier might be applied in the form of a semiplastic material which would later become sufficiently hard to give the desired results.

For a further description of my invention reference may be had to the annexed drawing and specification at the end whereof the invention will be specifically pointed out and claimed.

In the drawing,

Figure 1 represents a vertical side elevation with parts broken away of a storage battery plate embodying my invention.

Figure 2 is a vertical cross section of a detail.

In the illustration there is shown a storage battery plate having a lug 1 adapted to be lead burned or otherwise fastened to a terminal post assembly. The storage battery plate proper consists of a top bar 2 and the bottom bar 3 connected together by a number of vertical metallic spines 4. Vertically placed against the top and bottom bars 2 and 3 and surrounding and spaced from the spines 4 are vertical tubes 5 of a material which is resistant to the action of the electrolyte. These vertical tubes contain a number of horizontal slots 6 which permit the contact of the electrolyte with the active material 7 of the storage battery plate which consists of powdered oxides of lead placed in the space between the vertical tubes 6 and the spines 4.

Surrounding the bottom ends of the spines 4 are placed washers or plugs 8 in contact with the bottom bar 3. These plugs are also of a materal resistant to the action of the electrolyte, such as hard rubber. If preferred, however, these washers or plugs may be made of a semiplastic material, such as the sealing compound customarily used to seal the jar tops of storage batteries into the jar.

I do not intend to be limited in the practice of my invention save as the scope of the prior art and of the attached claims may require.

I claim:

1. In a storage battery plate an element comprising a top bar, a bottom bar, a spine connecting said bars, a slotted tubular element surrounding said spine and spaced therefrom, active material in the space between the spine and the tubular element, and a non-metallic plug between the active material and a portion of the bottom bar, which portion is contained within and closes the tubular element.

2. In a storage battery plate, an element comprising a top bar, a bottom bar, a spine connecting said bars, a perforated tubular element surrounding said spine and spaced therefrom, active material in the space between the spine and the tubular element, and a non-metallic plug between the active material and a portion of the bottom bar, which portion is contained within and closes the tubular element.

CHARLES D. GALLOWAY.